(12) United States Patent
Ognev et al.

(10) Patent No.: US 7,614,043 B2
(45) Date of Patent: Nov. 3, 2009

(54) AUTOMATED PRODUCT DEFECTS ANALYSIS AND REPORTING

(75) Inventors: Alexandre Ognev, Bellevue, WA (US); Jiazhen Wu, Sammamish, WA (US); Raja D. Venugopal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/283,917

(22) Filed: Nov. 21, 2005

(65) Prior Publication Data

US 2007/0074149 A1   Mar. 29, 2007

Related U.S. Application Data

(60) Provisional application No. 60/711,495, filed on Aug. 26, 2005.

(51) Int. Cl.
*G06F 9/44* (2006.01)
*G06F 15/18* (2006.01)

(52) U.S. Cl. ............................ 717/126; 706/12

(58) Field of Classification Search ......... 717/124–133, 717/126–127; 706/12
See application file for complete search history.

(56) References Cited

U.S. PATENT DOCUMENTS

| | | | | |
|---|---|---|---|---|
| 5,999,731 A * | 12/1999 | Yellin et al. | .................. | 717/126 |
| 6,075,940 A * | 6/2000 | Gosling | ....................... | 717/126 |
| 6,658,651 B2 * | 12/2003 | O'Brien et al. | ............. | 717/127 |
| 6,738,928 B1 * | 5/2004 | Brown | ......................... | 714/26 |
| 6,973,595 B2 * | 12/2005 | Kaminsky et al. | ............. | 714/43 |
| 7,058,928 B2 * | 6/2006 | Wygodny et al. | ............ | 717/128 |
| 7,299,455 B2 * | 11/2007 | Anderson et al. | ........... | 717/127 |
| 2005/0278703 A1 * | 12/2005 | Lo et al. | ..................... | 717/126 |

OTHER PUBLICATIONS

Dwyer et al. "Tool-supported program abstraction for finite-state verification" Jul. 2001, IEEE computer Society, ICSE '01, pp. 177-187.*
Robby et al. "Bogor: an Extensible and Highly-Modular software Model Checking Framework", Sep. 2003, ACM, ESEC/FSE-11, pp. 267-276.*
Weimer et al. "Finding and preventing run-time error handling mistakes", Oct. 2004, ACM, pp. 419-431.*

* cited by examiner

*Primary Examiner*—Anna Deng
(74) *Attorney, Agent, or Firm*—Workman Nydegger

(57) ABSTRACT

An automation infrastructure which automatically analyzes software faults and/or bugs related to a product defect is provided. More particularly, the system can automatically analyze and detect symptoms in the forms of crash dump, memory leak, corruption and test issues etc. In accordance therewith, aspects can automatically search for and locate existing defect reports, if such existing reports are available. Moreover, aspects can automatically report new defects in a defect tracking database or other tracking mechanism.

11 Claims, 12 Drawing Sheets

US 7,614,043 B2

AUTOMATED PRODUCT DEFECTS ANALYSIS AND REPORTING

CROSS-REFERENCE TO RELATED APPLICATIONS

This application claims the benefit of U.S. Provisional Patent application Ser. No. 60/711,495 entitled AUTOMATED PRODUCT DEFECTS ANALYSIS AND REPORTING and filed Aug. 26, 2005. The entirety of the above-noted application is incorporated by reference herein.

BACKGROUND

In a computing environment, and more particularly a software development environment, a "bug" refers to any unwanted performance or behavior of a software application or program. Most often, when a bug is encountered, some form of analysis and subsequent "debugging" is usually in order. This analysis and subsequent "de-bugging" is most often a very time consuming and labor intensive task.

A software bug can refer to any fault in a computer program. For example, a bug that crashes the program is sometimes referred to as a "hard" bug. On the other hand, bugs often arise which do not typically prevent the program from performing a specified task. Rather, these types of bugs merely affect the operating characteristics of the software or computer program. As such, this category of bugs can be referred to as "soft" bugs. Probably the most severe product defects are asserts and crashes, which can also account for more than half of the defects found during product development cycle.

An assertion refers to a software programming construct that can verify the validity of an expression. In other words, programmers often employ assertions to simplify the debugging process as they are written to always evaluate in the affirmative (e.g., true). As such, when an assertion is found to be negative (e.g., false), the programmer can conclude an existence of a bug in the program. These situations are most often referred to as "assertion failures." A crash refers to a condition whereby a software product halts performance or performs in a less than expected manner.

In software development, testing is an integral part of quality control. For example, regression testing can refer to software testing in an effort to identify regression bugs. In other words, regression testing is employed to de-bug software that, for one reason or another, no longer functions properly. Most often, these types of bugs occur as an unintended consequence of program modifications. Regression testing frequently includes repeating previously run tests to determine if any previously addressed faults reoccur.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises an infrastructure which automatically analyzes software faults and/or bugs. More particularly, the system can analyze and detect symptoms in the forms of crash dump, memory leak, corruption and test issues etc. In accordance therewith, the aspects can automatically search for and locate existing defect reports, if such existing reports are available. Moreover, aspects can report new defects in a defect tracking database or other tracking mechanism.

It is to be understood and appreciated that this open and extensible framework can be applied to a wide range of applications where such analysis is needed and/or desired. For example, this framework (e.g., tool) can be applied from analyzing product defects during test execution to Watson-brand bucket analysis. In other examples, the tool can be employed in scenarios from reporting Prefix/Prefast issues to analyzing customer dumps.

Still another aspect employs rules-based logic to automate an action in accordance with a user preference. In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
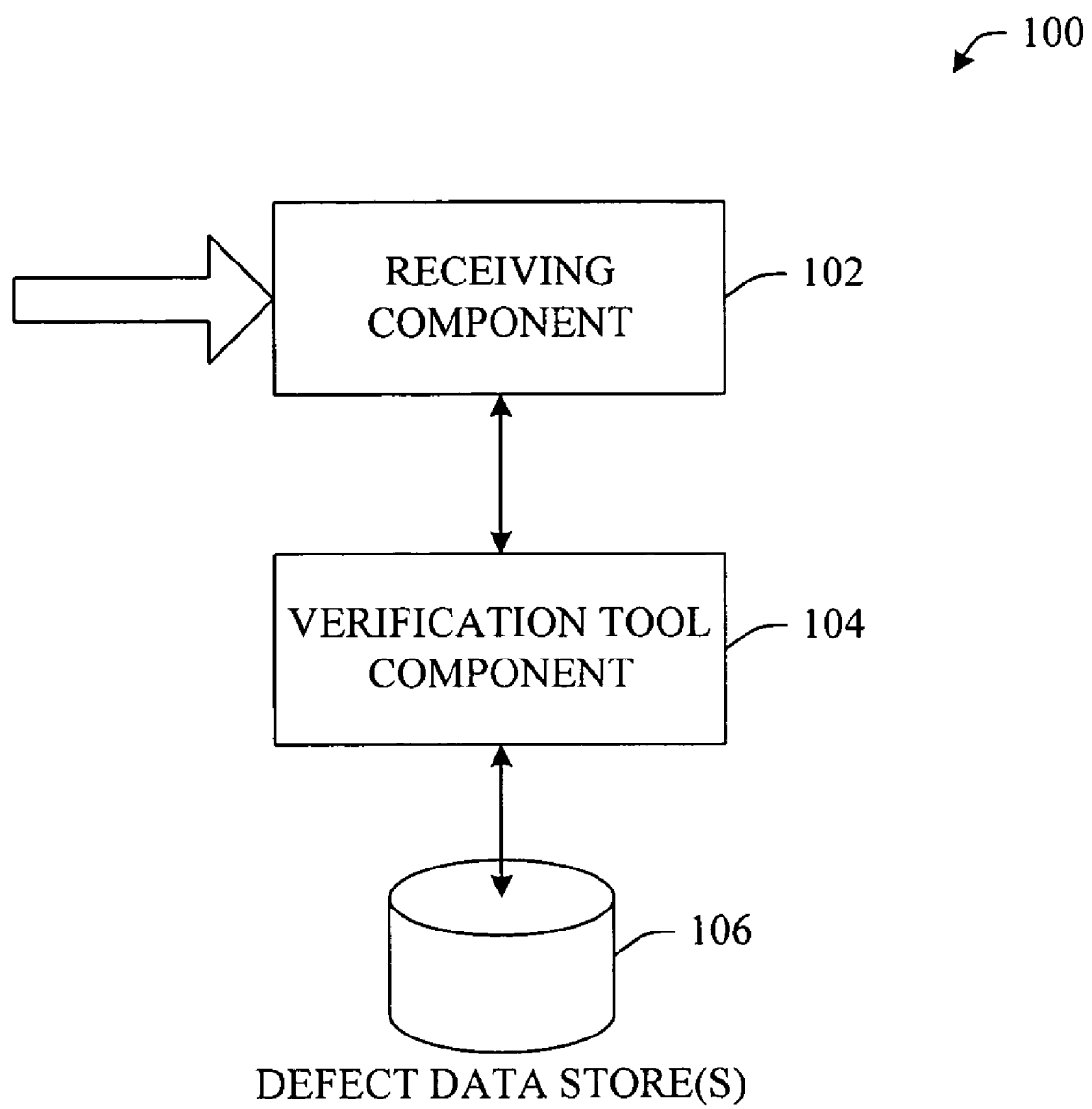
FIG. 1 illustrates a system that facilitates automatic logging of faults in accordance with an aspect of the innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In accordance with the innovation and in order to track faults and bugs, when a bug is found and/or rectified, it can be recorded and retested each time the program is modified. Many defects discovered during product development cycles could have wide impact and cause hundreds of tests to fail. Although failures are caused by a particular defect, each of these failures has to be analyzed to confirm that they are caused by the same defect. It could also take some time to fix a known product defect, sometimes weeks or months. In the meantime, these tests will have to be continuously executed everyday. Likewise, test failures are analyzed to either attribute failures to known product defects, or potential new defects. Some product defects found during a software development cycle, for example regression defects, are merely repeats of previously occurred defects.

Accordingly, the time required to investigate every product defect in order to record the specifics of each defect can be insurmountable. Additionally, in order to effectively track the reoccurrence of bugs, an engineer would have to have a log of prior bugs and likewise would have to manually research the log to determine if there is a match for a particular defect. As will be understood, in today's complex systems this would be an impossible task by human means. If there are no matches found, in order to file a defect, the subject system can automatically gather all of the necessary information with respect to the defect (e.g., defect type, product version . . . ) in order to log the individual defect.

Referring initially to FIG. 1, a system 100 that facilitates automatically analyzing and reporting product defects in accordance with an aspect of the innovation is shown. Generally, system 100 can include a receiving component 102, a verification tool component 104 and a defect data store component 106. Each of these components will be described in detail infra.

Probably the most severe product defects are asserts and crashes, which can also account for more than half of the defects found during product development cycle. In accordance therewith, the subject innovation, via verification tool component 104, can automate analysis and report functionality of these fault issues. Although many of the aspects described herein are directed to "hard-fault" issues, it is to be appreciated that the novel functionality described herein can be applied to "soft-fault" issues without departing from the scope of this disclosure and claims appended hereto.

In order to track faults and bugs, when a bug is found and/or rectified, the verification tool component 104 can record and retest bugs each time the program is modified. Today, product teams are often burdened with the high cost of executing regression tests and verifying test results. The subject system 100 can employ the verification tool component 104 to analyze, report and/or track bugs encountered related to a software product.

For example and as discussed above, in one aspect, many product defects found during software development cycle are merely repeats of previously occurring defects or a particular defect that can cause many tests to fail. Accordingly, the verification tool component 104 can particularly reduce the time to investigate every product defect in order to record the specifics of each defect. Additionally, the verification tool component 104 can facilitate efficient tracking of a reoccurrence of bugs. In other words, the verification tool component 104 can be employed to automatically search the defect data store(s) 106 in order to locate similar bugs.

Moreover, the verification tool component 104 can be employed to research the product defect data store 106 to determine if there is a match for a particular defect. If there are no matches found, the verification tool component 104 can gather information relating to the defect (e.g., defect type, product version . . . ) and subsequently create a new entry in the defect data store(s) 106. These novel concepts and techniques will be better understood upon a review of the figures that follow.

Figure 2:
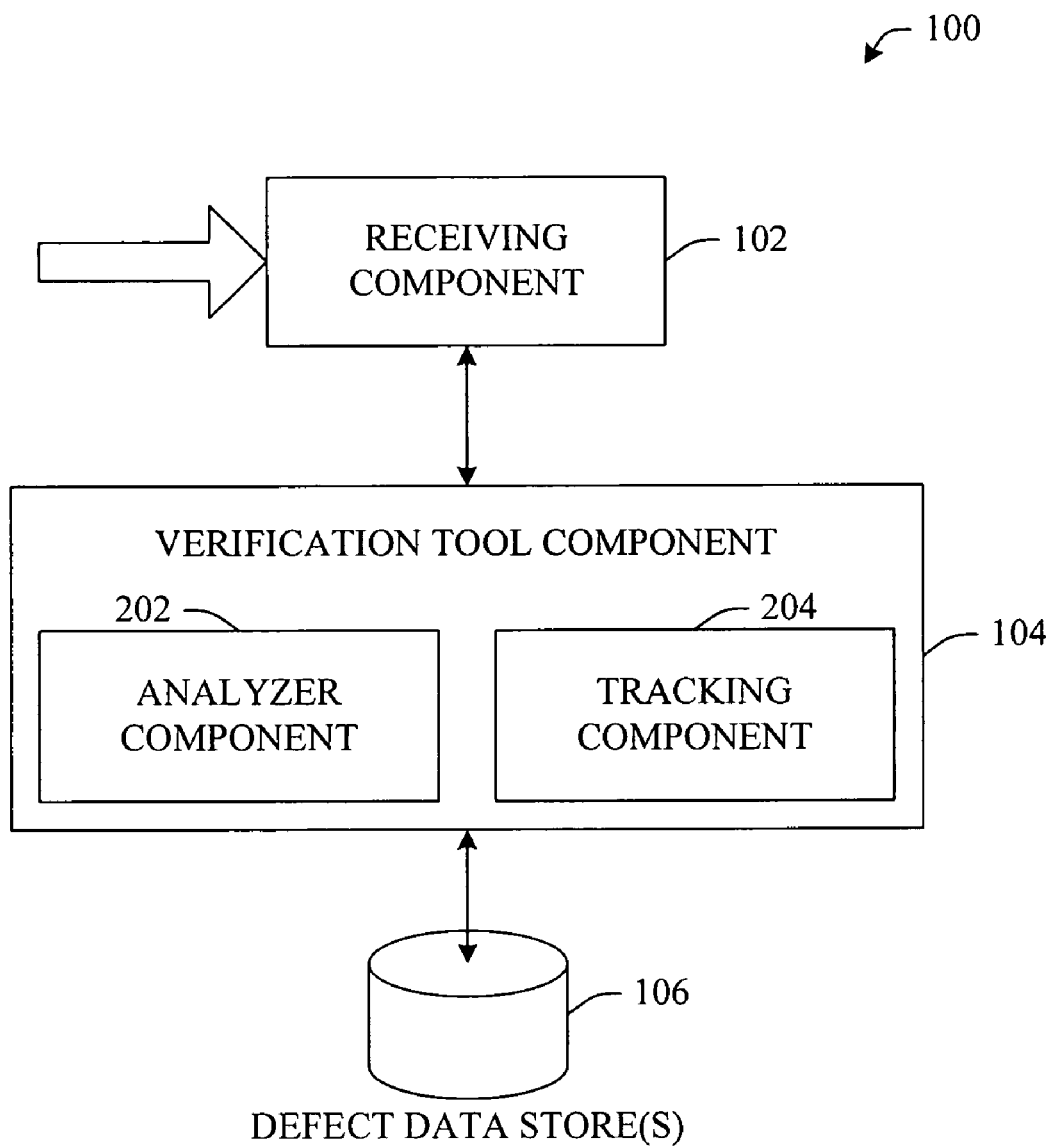
FIG. 2 illustrates a system that facilitates analyzing and tracking product defects in accordance with an aspect.

As shown in FIG. 2, the verification tool component 104 can include an analyzer component 202 and a tracking component 204. In one example, the subject analysis and tracking mechanism(s) (202, 204 respectively) can employ programming languages that are specifically optimized to build decision-support applications (e.g., extensible markup language (XML)) thereby automatically and reliably extracting information from memory dump files generated when these issues occur. For example, the verification tool component 104 can obtain the offending function call and its associated call stack, as well as data structures needed for searching, comparing and reporting issues in a defect tracking database 106.

In addition and in other aspects, the invention can detect (via analyzer component 202) and file hard and/or soft-fault issues automatically (via tracking component 204), including error conditions in a product, memory leaks, severe performance issues and other unhealthy state(s) of the product. By employing a flexible framework, the aspects can allow data input into receiving component 102 from a variety of sources and can employ specific process rules for different issues. Furthermore, any new issue type(s) can be easily added and customized in the framework (e.g., system 100). These additional customized frameworks are to be considered a part of this disclosure and claims appended hereto.

As stated earlier, the subject innovation can employ the analyzer component 202 to analyze dumps or product defects/crashes. Once the individual defect is located and analyzed, the novel innovation can intelligently search a product defect database 106 (e.g., Product Studio-brand database) in order to identify similar existing bugs. If needed, new bugs can be filed into the tracking database (e.g., defect data store(s) 106. It will be understood that it is particularly desirable to store the information in a consistent and efficient manner thus, effecting ease of retrieval. Exemplary consistent and efficient mechanisms (e.g., templates) will be described in greater detail infra.

The sophisticated algorithm used by the innovation described herein to search the defect tracking database (e.g., defect data store(s) 106) is an important and novel feature of the innovation. The algorithm (e.g., via analyzer component 202) facilitates discovery of whether there are already (the same or similar) entries describing a detected issue. The algorithm can be employed to search and compare issues (e.g., defects) based on a number of factors, including, but not limited to, function call stack, file name and line number, issue description and test name.

It will be understood that the algorithm can achieve balance between a possibility of filing a duplicate bug and a risk of missing a unique failure by attributing the failure to an unrelated existing bug. The search algorithm can handle multiple levels of code branches whereby a bug can be fixed in one branch and a test can be run on another branch that still does not contain a fix. This branching technique will be better understood upon a review of FIG. 9 that follows.

Of course, there are many different kinds of environments where automatic defect analysis is desired. Each of these environments may have different requirements, processes and policies. Accordingly, the subject verification tool component 104 can be configured and/or integrated into other applications thereby enabling employment in wide range of frameworks. For example, the verification tool component 104 allows maximum custom configuration, which can include core components such as issue description and processing objects, search algorithm(s) and defect reporting template. All of the core components can be easily configured according to specific needs by simply changing settings in the configuration file (e.g., XML configuration file). Thus, the verification tool component 104 can be particularly versatile and universally applicable.

The following scenarios are provided to add context to the invention and are not intended to limit the invention in any way. In one particular aspect, the verification tool component 104 can be leveraged to automatically analyze and report Watson-brand hits gathered from customer sites using a Watson-brand report infrastructure. In still another aspect, the verification tool component 104 can also be used in PSS to analyze crash dumps sent by customers.

Figure 3:
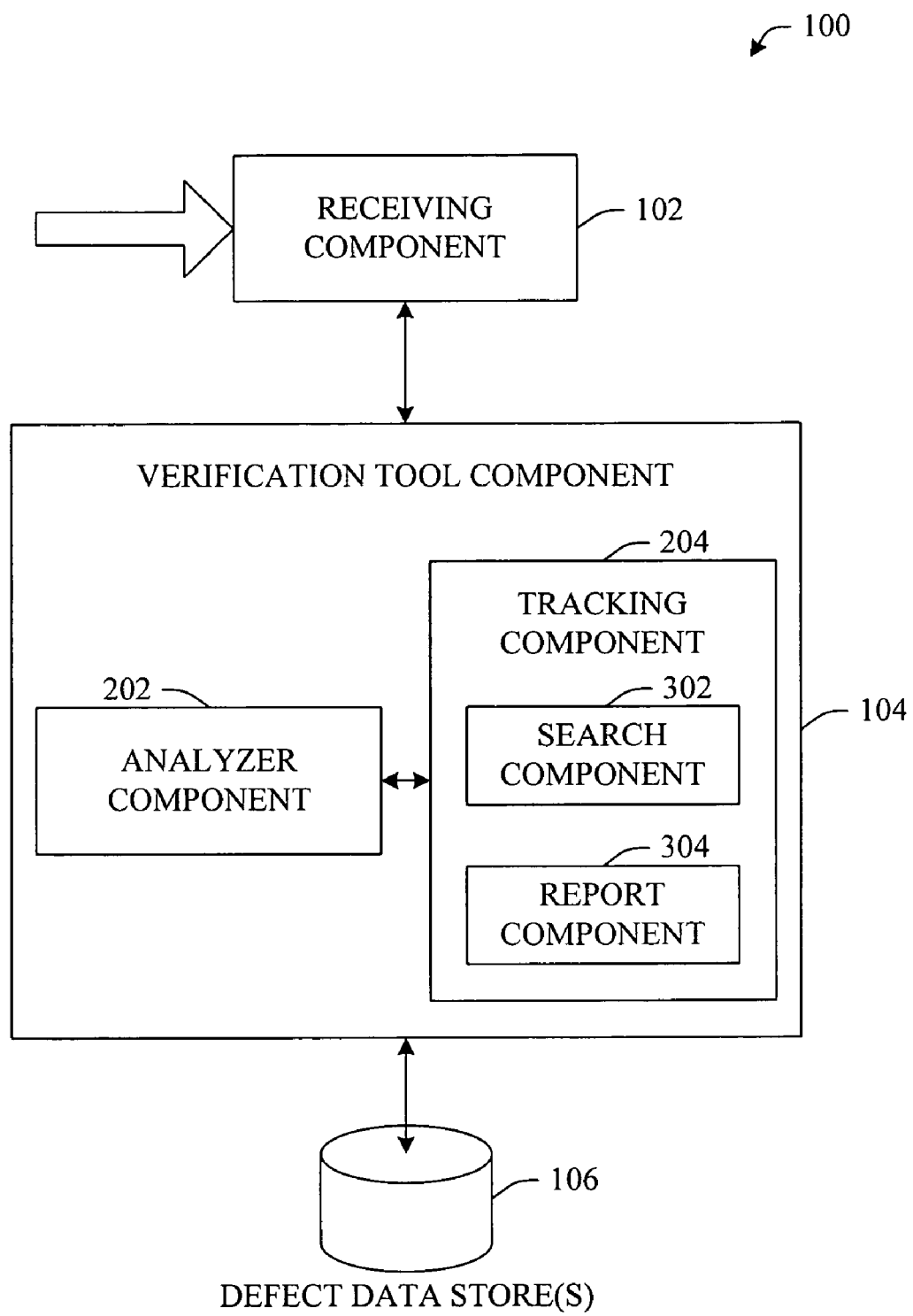
FIG. 3 illustrates a system that employs a search component and a report component to automatically log product defects in accordance with an aspect of the innovation.

Turning now to FIG. 3, the verification tool component 104 infrastructure can be implemented as a library of managed classes which can be integrated with different test execution frameworks. It will be appreciation that this novel library of managed classes can particularly enable the functionality to be integrated into disparate applications and/or environments. For example, in aspects, the automated mechanism(s) can also be deployed as a standalone tool and/or integrated into a larger system. Following is a discussion of the subject automated analysis, tracking and reporting tool component 104.

As illustrated in FIG. 3, the receiving component 102 can take input from various sources. By way of example, the receiving component 102 can obtain an input via crash dumps from assert, memory access violation (e.g., AV), scheduler issues or other types of custom dump(s). Accordingly, the analyzer component 202 can extract the function call and associated call stack analysis. In one example, DScript-brand technology can be employed by the analyzer component 202 to extract the function call and associated call stack.

Moreover, the analyzer component 202 can also process information from server error logs (e.g., SQL-brand error logs), text dumps, application logs, and files containing any information that can be consumed by customized issue analysis objects (e.g., XML files). It will be appreciated that this additional information can be stored and/or retrieved locally and/or remotely. For example, a local database such as defect data store 106 can be employed to store this log information. As well, it is to be appreciated that the defect data store 106 illustrated in FIG. 3 can be representative of a remote data store accessible via any wired and/or wireless technique. In one specific example, the defect data store 106 can represent the Internet whereby, information can be stored in multiple locations and retrieved therefrom without departing from the novel functionality of the innovation.

In one aspect, based upon a specific issue received by the receiving component 102 and corresponding policy for that issue identified via the analyzer component 202, the verification tool component 202, via tracking component 204, can employ a sophisticated algorithm to search the defect data store 106 for bugs that might already describe the issue or be related to the issue. As illustrated, tracking component 204 can include a search component 302 and a report component 304 to effect locating and reporting bugs as described in greater detail infra.

In one example, the tracking component 204, via search component 302, can search a defect database 106 (e.g., Product Studio-brand database) for the same and/or similar issues. The tracking component 204 can search and compare any descriptive criteria, including but not limited to, function call stack, file name and line number, issue description and test name. It is to be understood that the algorithm employed by the tracking component 204 can be manually or automatically tuned to achieve optimum balance between the possibility of filing a duplicate bug and the risk of missing a unique failure due to attributing the bug to an unrelated existing bug. Moreover, as stated supra, a search algorithm can be employed to handle multiple levels of code branches where the bug can be fixed in one branch and a test can be run on another branch that still does not contain a fix.

In operation, when a product (e.g., application) crashes, a dump is created. It will be appreciated that, for example, a dump file or trace file can be created as an sqldump*.txt and sqldump*.mdmp file in alternative aspects. In other words, oftentimes the dump or trace file will include a text file and/or a binary file.

The subject innovation can accept the input dump file via the receiving component 102 and extract information via the analyzer component 202. For example, the subject innovation can extract the actual call stack information that caused the product to crash from the input. Other specific information for different types of issues can also be extracted (e.g., expressions).

Once the information is extracted by the analyzer component 202, the information can be considered a "signature" for a particular defect. The signature can be used to effect a defect search via search component 302 upon an existing defect database, for example the defect data store 106.

Essentially, the search component 302 can employ a "bug lookup" to find the same and/or similar bugs. For example, a search can be initiated for the stack of the existing bug. As well, the innovation can distinguish from disparate code branches in the analysis. By way of further example, suppose a defect is found in branch A but, the defect has not yet affected branch B. In this scenario, although a similar bug may be found in the defect database 106, the innovation can resolve the new branch B bug as a duplication of an existing bug (e.g., the bug found in branch A). As a result, the defect can be logged by the report component 304 as a new bug and not an updated bug. In other words, in the above scenario, e.g., where a defect is fixed in branch A but, the fix has not yet affected branch B, the innovation can resolve the new branch B bug as a duplication of an existing bug. At the same time, the innovation will not resolve new bugs found in different branch as duplication of an existing bug.

Figure 4:
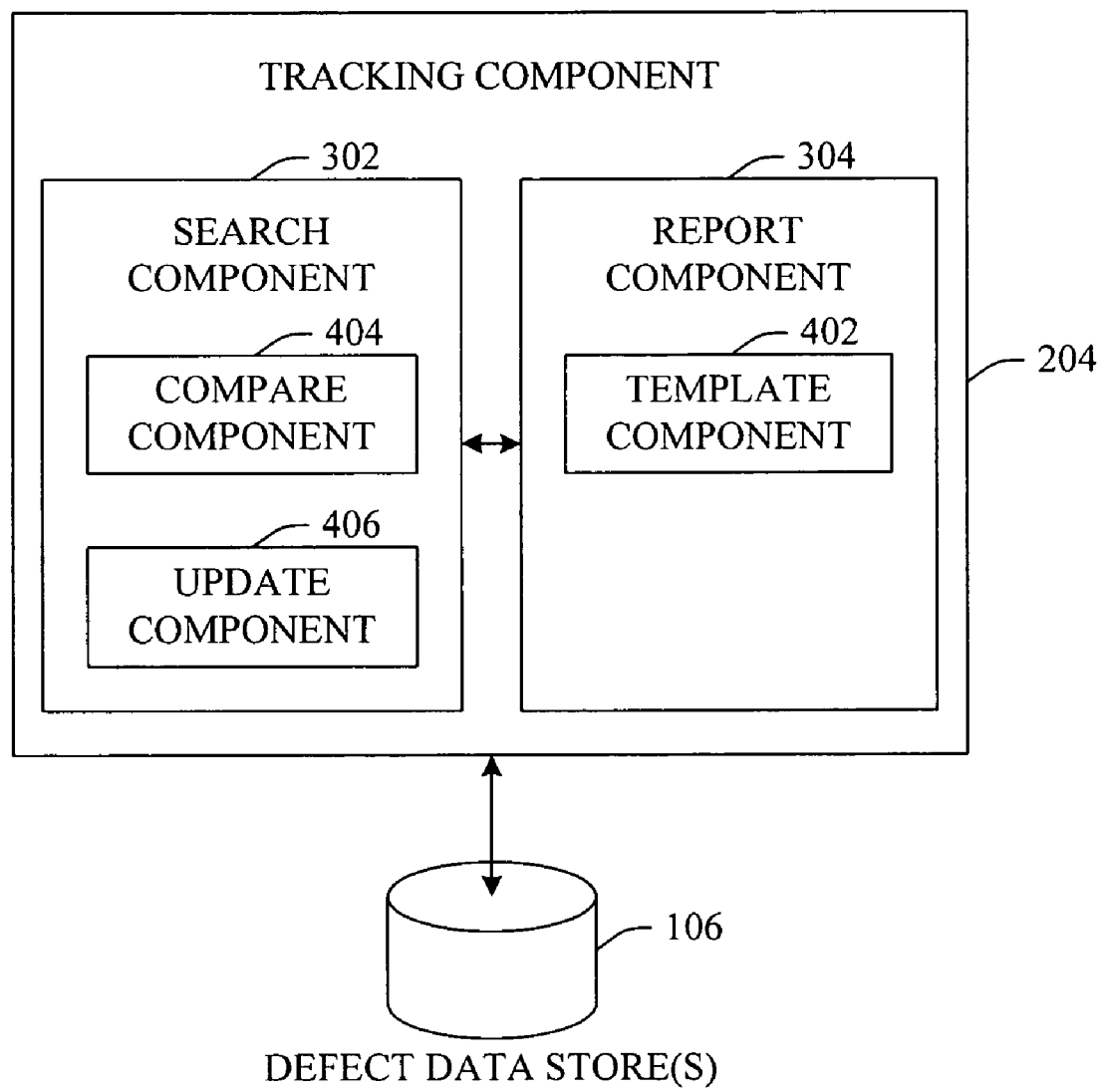
FIG. 4 illustrates a system that employs a compare component and an update component to automatically search for same or similar product defects in accordance with an aspect of the innovation.

Turning now to FIG. 4, a general block diagram of tracking component 204 is shown. As illustrated, tracking component 204 can include a search component 302 and a report component 304. As described above, in operation, the search component 302 can be employed to search an external (or local) data source (e.g., data store 106) whereas the report component 304 can effect appropriate action thereafter. The report component 304 can employ a predefined template component 402 when logging (e.g., reporting) new bugs.

By way of example, filing (e.g., logging) a new bug can use highly customizable XML templates 402, where all (or a portion thereof) of fields of a bug entry can be customized according to specific needs. When filing a bug into data store 106, the tool (104 from FIG. 1) (e.g., via search component 302) can automatically collect (and/or generate) and attach a set of related files needed for debugging. For example, in addition to collecting files, the innovation can generate additional files by running any type of analysis, including but not limited to DScript-brand scripts. The report component 304 can link the subject bug to related bugs found by search algorithm. This set of files can also be customizable via the XML configuration to include dump, database and log files, error log and test scripts, etc.

As shown, the search component 302 can include compare component and update component 404, 406 respectively. These components 404, 406 can be effected via algorithm described above. One particular goal of the search component 302 is to identify bugs that are active in the build under test and that describe the same or relatively similar issue. This functionality can be accomplished via the compare component 404.

If the search component, via the algorithm and compare component 404, finds there is already a bug that exists describing the same issue, the tool can employ the update component 406 to modify existing bugs according to policies specified in the XML file. For example, the update component 404 can modify the bug by attaching additional information and/or raising bug priority. The update component 404 can also revise test results to mark the failure with the corresponding bug.

It is to be understood that the search component 302 can employ numerous techniques to search and/or identify bugs. In one example, the search component 302 can search bugs by title using multiple queries for each type of issue. In another example, a stack matching technique can be employed. This stack matching technique will be better understood upon a review of FIG. 8 that follows.

Bugs that are fixed and/or not fixed in a particular code branch can also be searched via the search component 302. In this case, the bug can be resolve or closed but still considered active by the subject innovation. This branching logic will be better understood upon a review of FIG. 9 that follows.

In still another example, duplicates can be evaluated via the search component 302. In this example, the system can search the duplicates, compare stacks (e.g., signatures) and report the primary bug(s). It will be appreciated that this novel mechanism can be particular complex thereby requiring the system to drill down into the characteristics in order to distinguish or identify differences. It is to be understood that the search component 302 can identify a best matching bug from a set if more than one satisfies the criteria.

Figure 5:
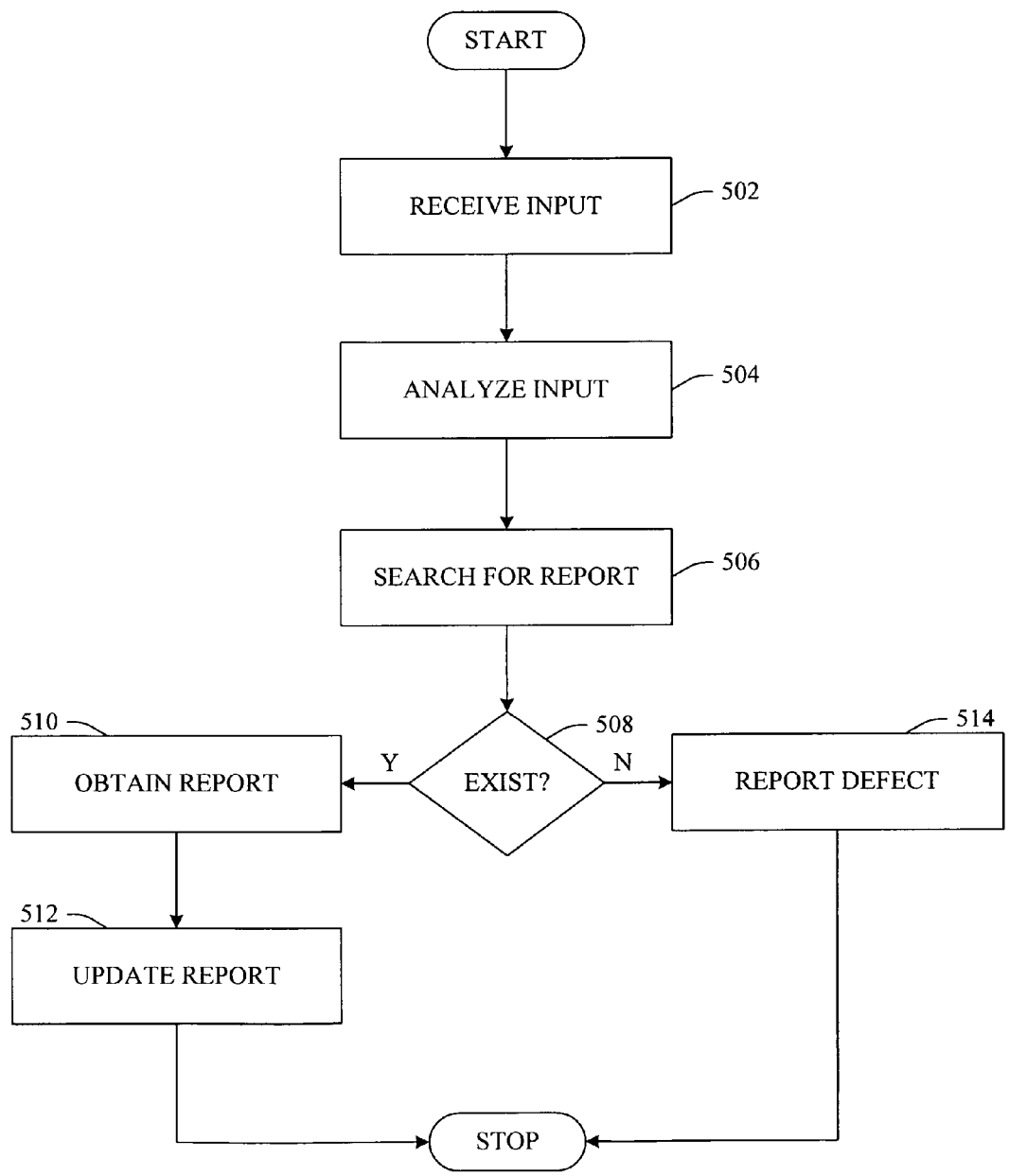
FIG. 5 illustrates an exemplary flow chart of procedures that facilitate analyzing and tracking product defects in accordance with an aspect of the invention.

FIG. 5 illustrates a methodology of automatically tracking a product defect fault in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 502, an input that represents a bug or fault can be received. As described above, the input can be received from a variety of sources including, but not limited to, crash dumps from assert, scheduler issuer or other types of custom dump(s). The input can be analyzed at 504. As described above, in one aspect, an analyzer component can be employed to extract function call and associated call stack information.

In accordance therewith, an existing report can be searched at 506. The search can employ various described mechanisms including, but not limited to, stack matching and branching logic. At 508, a determination is made if an existing report (e.g., bug) is located. If an existing report that corresponds to the received fault/bug is found, information is received concerning the bug at 510. At 512, the existing information is updated, if found to be appropriate. If, at 508, an associated report is not located, the new defect (e.g., fault, bug) is reported (e.g., logged in tracking database) at 514.

As described supra, it is a novel feature of the tool described herein to automatically track faults/bugs. Accordingly, it is to be appreciated that the act of reporting a fault/bug at 514 can be effected automatically (e.g., without human intervention). Moreover, as will be described with reference to FIGS. 6 and 7, rules-based logic and/or artificial intelligence (AI) mechanisms can be employed to assist in automating reporting, as well as analyzing, searching, etc. It is to be appreciated that rules-based and/or AI (e.g., machine learning) mechanisms can be employed to automate any of functionalities of the tool described herein.

Figure 6:
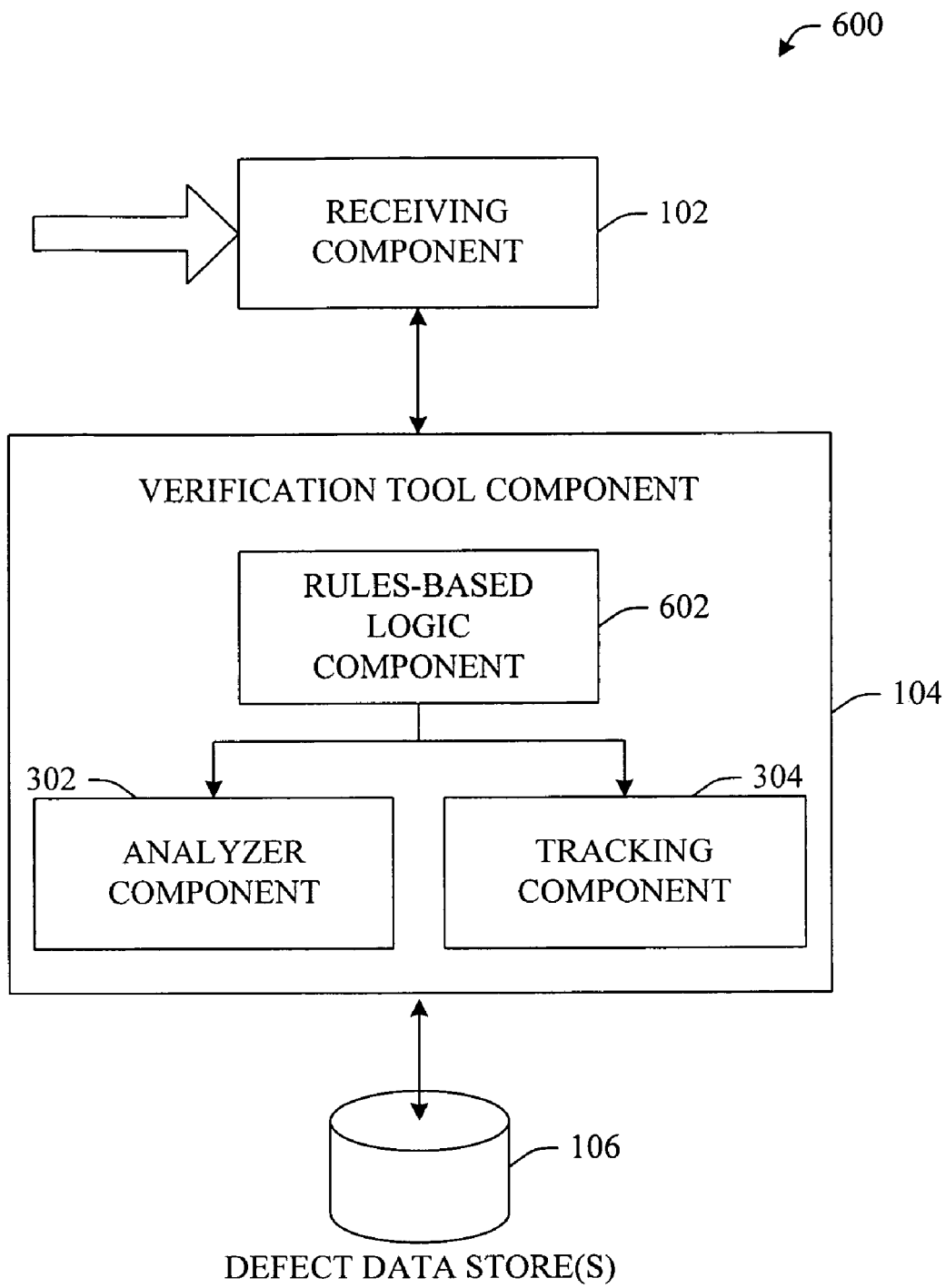
FIG. 6 illustrates an exemplary architecture including a rules-based logic component that facilitates automation in accordance with a user preference.

With reference now to FIG. 6, an alternative aspect of the novel functionality is shown in system 600. More particularly, system 600 can include a rules-based logic component 602. In accordance with this alternate aspect, an implementation scheme (e.g., rule) can be applied to facilitate automation of the analyzer component 302 and/or the tracking component 304. It will be appreciated that the rule-based implementation can automatically and/or dynamically define and implement a query of a data store. In response thereto, the rule-based implementation can select data component(s) (e.g., reports) included within the result(s) by employing a predefined and/or programmed rule(s) based upon any desired criteria (e.g., fault type, stack characteristics, importance . . . ).

Figure 7:
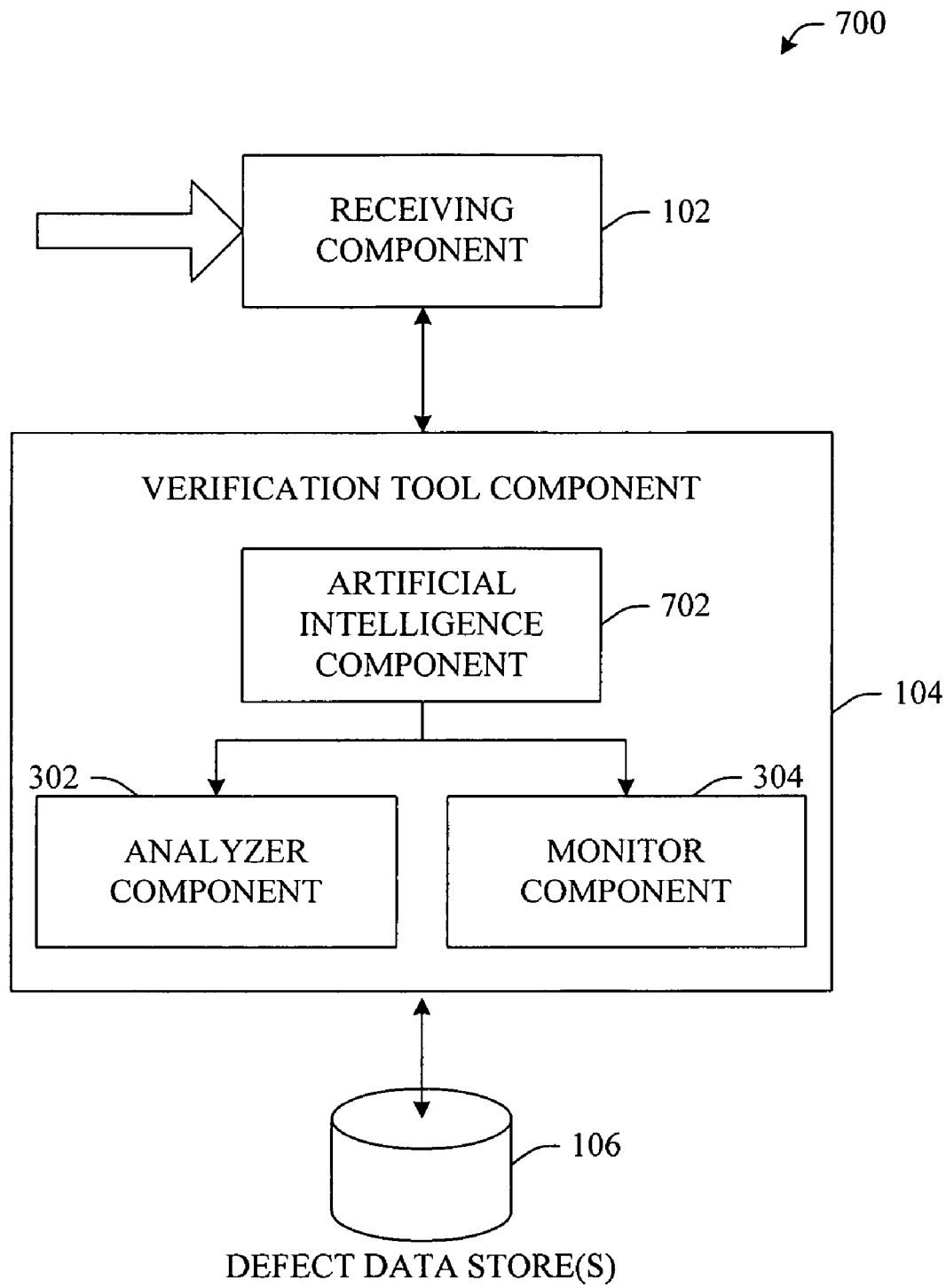
FIG. 7 illustrates an architecture including an artificial intelligence-based component that can automate functionality in accordance with an aspect of the invention.

FIG. 7 illustrates a system 700 that employs AI which facilitates automating one or more features in accordance with the subject invention. The subject invention (e.g., in connection with analysis, searching, reporting fault and/or bugs can employ various AI-based schemes for carrying out various aspects thereof. For example, a process for determining when a bug will be reported can be facilitated via an automatic classifier system and process. As well, when data is located (e.g., stored) in multiple defect data stores, a process for determining which data store, or group of data stores, to search can be effected via a machine learning technique.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of faults/bugs, for example, attributes can be fault type or other specific attributes derived from the type, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when/if to search for an existing report, when/if to update a report, when/if to log a new fault/bug, etc.

In still other aspects, machine learning (and/or rules-based) techniques can be employed to build a system that can automatically combine scenarios and/or situations to determine when/if hard and/or soft faults occur or are likely to occur. In accordance therewith, these mechanisms can be employed to determine preventative and/or reporting action based upon historical, statistical, rules-based, or the like criteria.

Figure 8:
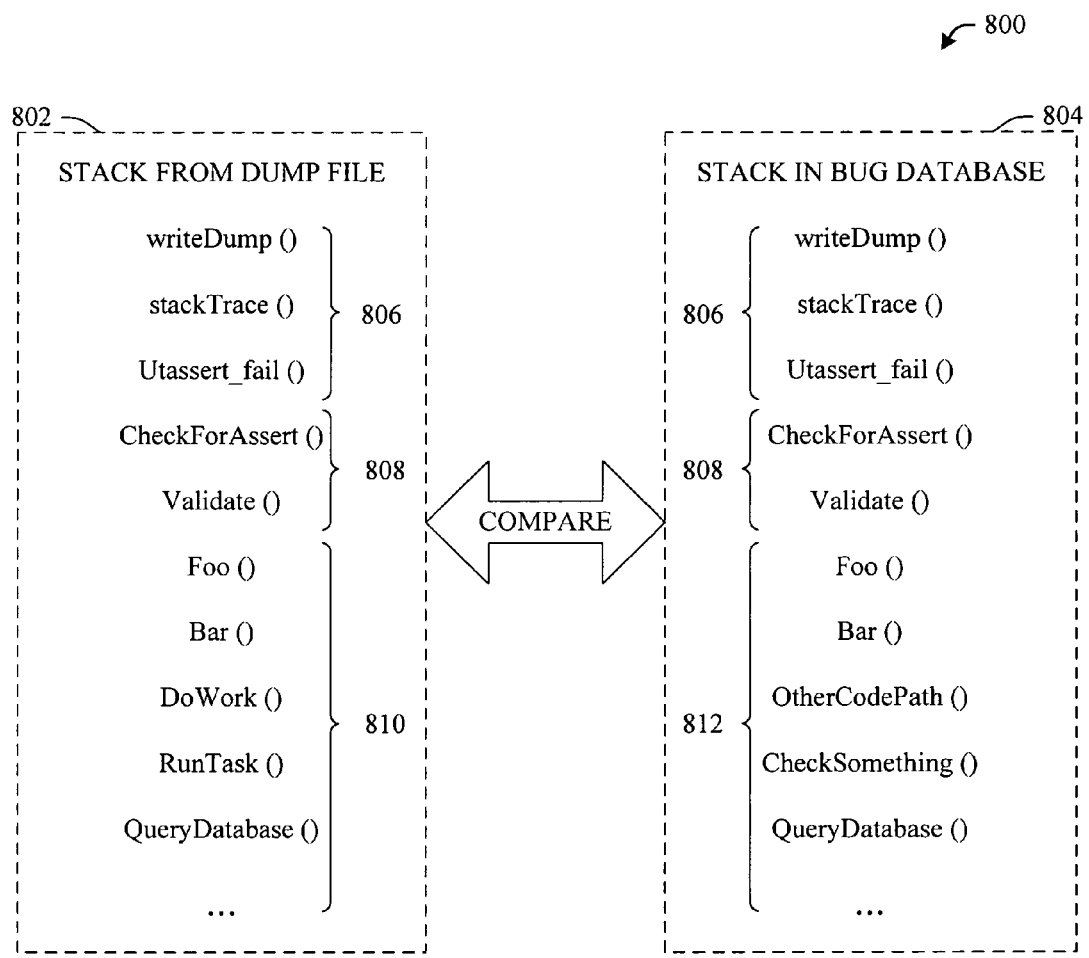
FIG. 8 illustrates a graphical representation of a stack matching sequence in accordance with an aspect of the innovation.

Turning now to FIG. 8, a graphical representation 800 of a stack matching sequence in accordance with an aspect of the innovation is shown. More particularly, the graphical representation 800 in FIG. 8 can include a representative stack from a subject dump file 802 and a stack of a bug in a defect database 804. It is to be appreciated that the graphical representation 800 of FIG. 8 is included to provide perspective to the invention and is not to be considered limiting in any manner. It is further to be appreciated that additional aspects exist that compare more than two representative stacks in order to facilitate the novel analyzing, searching and tracking functionality described herein. These additional aspects are to be included within the scope of this invention and claims appended hereto.

With respect to stack matching, the subject innovation can compare stack 802 to stack 804 in order to determine presence of similar and/or exact bugs in a tracking database or file. In operation, the innovation can, via compare component 404 of FIG. 4, employ stack filters to remove noise or irrelevant portions of the stack. In one example, filters can be employed to remove unfreed memory asserts.

In accordance with the illustrated aspect, filters can be employed to remove portions common to both as well as noise (e.g., 806, 808). Once removed, the system can compare the remaining portions of the stacks in accordance with a user defined (or machine inferred) criteria. In other words, a number of frames to consider can be configured by a user or other machine logic or learning mechanism.

It will be appreciated that the remaining elements can be compared as desired. For example, in one aspect, only the top call stack is compared to determine similarity. In yet other aspects, all remaining call stacks are compared. In other words, any desired number of call stacks can be compared to assess or evaluate similarity.

In a more particular, and exemplary, stress aspect, a user can compare the remaining five portions (810) from the stack found in the dump file 802 to the remaining five portions (812) found in the bug database in order to evaluate similarity. Similarly, in an exemplary functional run aspect, three portions can be compared to determine similarity or exactness. In still another aspect, the number of portions or stacks to compare can be locked down or predetermined (e.g., rules-based) in a system policy. Thus, in this aspect, the user can merely select the type of the run to employ (e.g., stress, functional).

Figure 9:
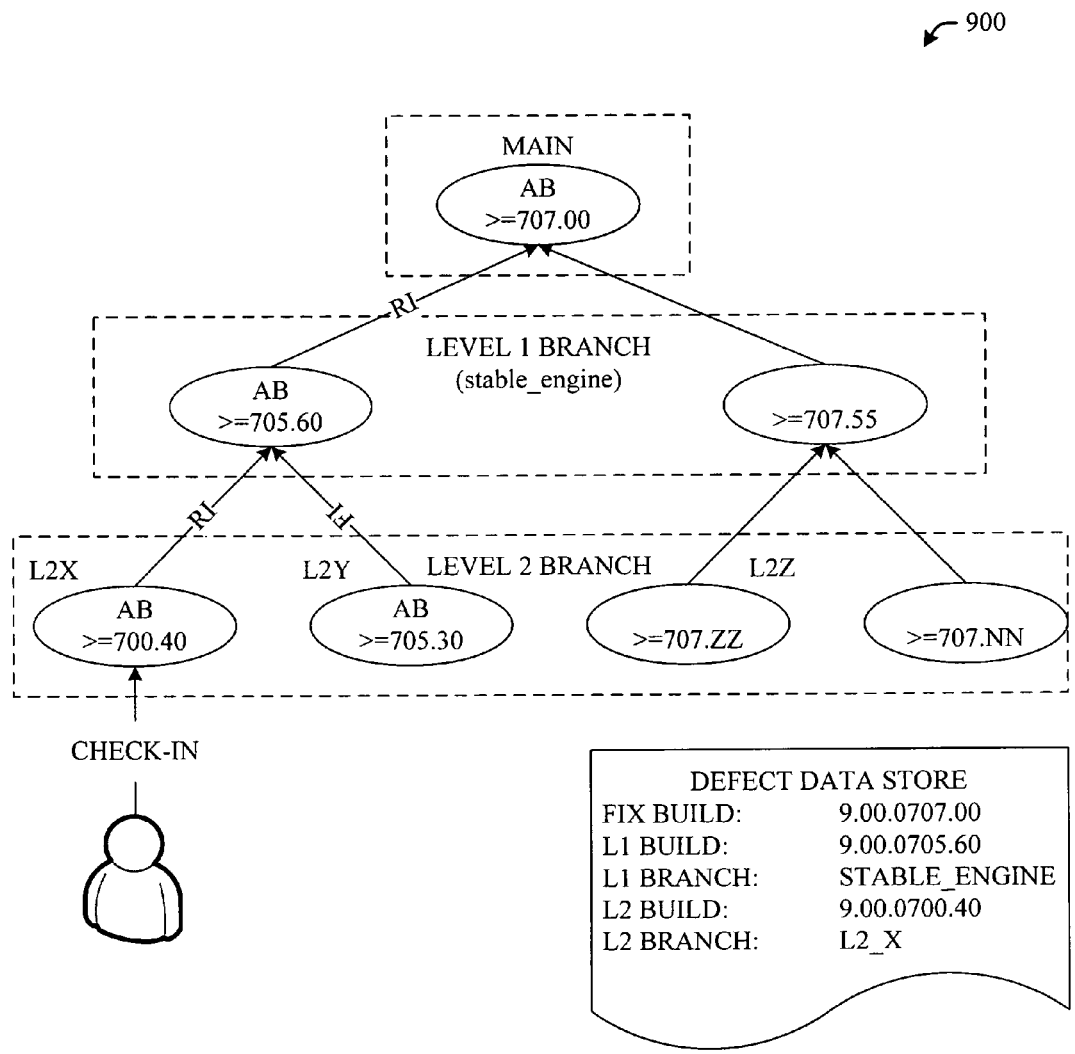
FIG. 9 illustrates a graphical representation of branching logic in accordance with an aspect of the innovation.
Figure 10:
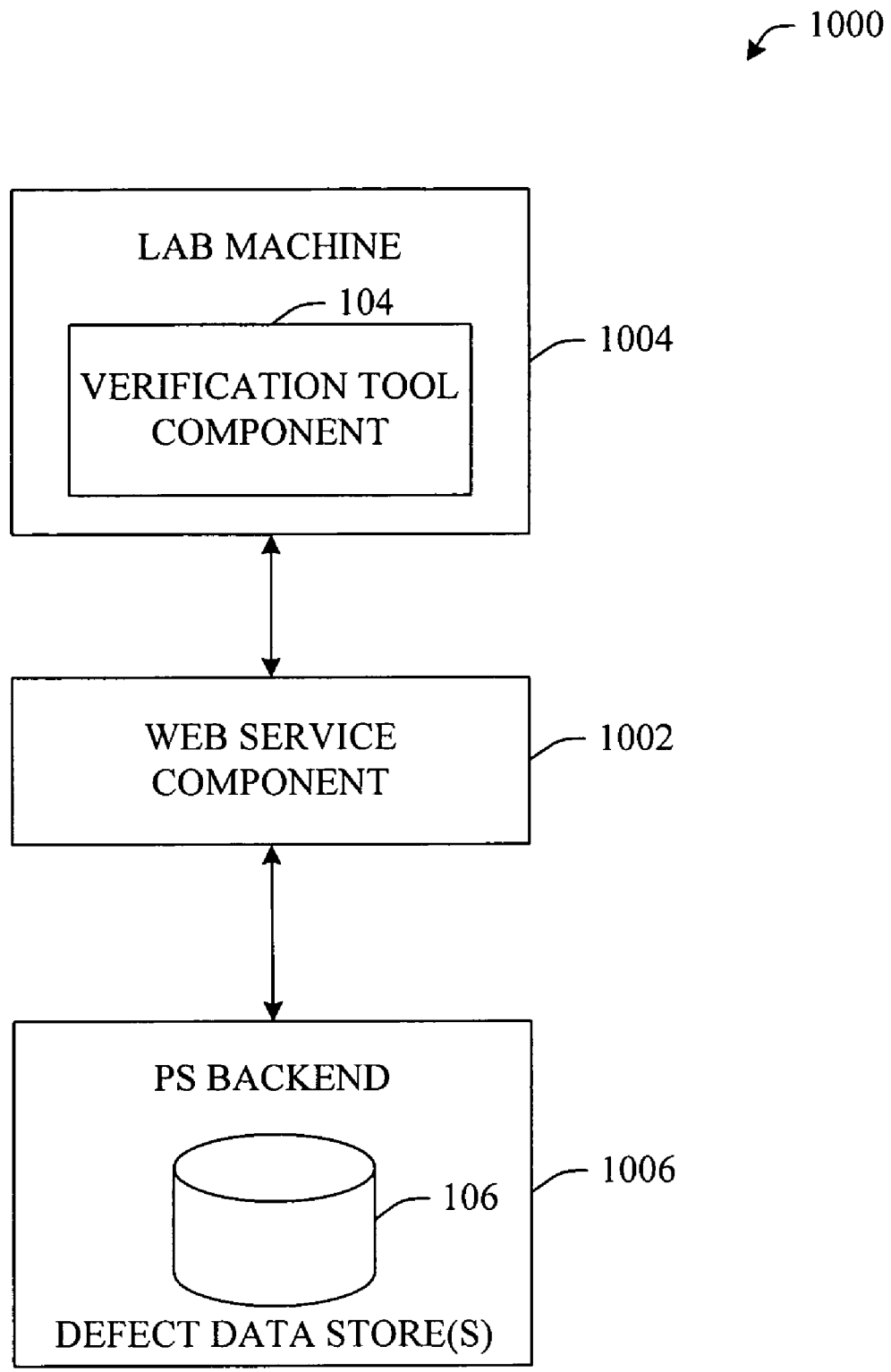
FIG. 10 illustrates a block diagram of an exemplary web-based system in accordance with an aspect of the innovation.

Referring now to FIG. 9, a graphical representation of branching logic in accordance with an aspect of the innovation is shown. Although the diagram illustrated in FIG. 9 only illustrates three exemplary levels of branches, it is to be understood and appreciated that other aspects exist that can include more or less branches (and/or levels) without departing from the scope of the innovation. As well, other aspects exist where each level can include a higher or lower number of branches than shown in FIG. 9. These alternative aspects are to be considered a part of this disclosure and claims appended hereto.

Referring now to the diagram illustrated in FIG. 9, three levels are shown. On the top level is the Main level which represents the grandparents of a particular node located in Level 2. In other words, this is the final code that the other levels (e.g., Level 1 and Level 2) check into. It will be appreciated that in an SQL implementation of the novel system, the Main level can be named SQLMain.

Before the nodes of the branches (e.g., Level 1 and Level 2) can check into Main, the nodes must travel through the stable_engine level or Level 1. At this point the node can be "stabilized" before checking into Main. It will be appreciated that this intermediate level supports product quality by limiting access to the top level. For example, if a number of engineers are working on code for a project, it would not be particularly advantageous for each engineer to unitarily check code into the top level without first stabilizing such code. As such, this stable_engine layer or intermediate layer is provided to effectuate stabilization.

As shown in FIG. 9, at the bottom is L2X branch—which represents the X branch of Level 2. In reality, this branch can represent a team of programmers that work on a task locally prior to uploading or integrating the code into the stable_engine layer. As will be understood, each of the branches shown can create a product build.

In one aspect, once the build is produced, it can be tested. For example, functional and stress tests can be run to check the integrity of the build. One key to this branching concept is to find an issue early prior to impacting other groups and/or branches. Due to the branching logic, the subject innovation is capable of this early detection.

Referring again to the nodes of each Level, it is to be understood that, essentially, there are tests running at each node. This simultaneous testing presents unique challenges to the system. For example, starting with check-in the L2X branch, as shown, this branch can generate a build number (e.g., 700.40). Note, this build numbering system is an arbitrary naming convention and is not to be considered limiting of the novelty of the innovation. In other words, any naming convention can be used in accordance with the innovation. Once built, the L2X branch can reverse integrate into the stable_engine branch. This step is indicated by "RI" arrow designation from L2X to the stable_engine level of FIG. 9.

Now, on the stable_engine branch and as shown, a new build (e.g., 705.60) is generated. Due to the reverse integration, this build will include changes to L2X as shown. As designated by the directional arrows, in this aspect, all changes are flowing from the child branches to the parent branches. Moreover, the child branch can periodically integrate changes from the parent branch. This situation is referred to as forward integration (FI). As shown and indicated by the "FI" arrow, L2Y obtains changes from the stable_engine layer.

Once the information is integrated from the stable_engine layer into L2Y, a new build can be created. As shown this new build, 705.30, can include everything from the parent branch, the stable_engine branch, as well as the localized L2Y branch. Ultimately, this information from the stable_engine branch can be reverse integrated into Main.

In operation, suppose there is a build at the stable_engine layer, a crash occurs and dump file is analyzed. Accordingly, the innovation can analyze the issue of the dump. In the example of FIG. 9, the build of the stable_engine branch with the changes from L2X reverse integrated is 705.60, therefore, builds with a lower build number than 705.60 of this branch will not include the change of the L2X branch. In this situation, if an issue (e.g., bug, fault) is discovered in the stable_engine build and the issue looks to be the same as an issue in the L2X branch, the system can deem this as a known issue. Accordingly, a new issue will not have to be filed.

It will be appreciated that this novel logic can compare the build numbers of individual branches (and/or nodes) in order to arrive with this conclusion. In other words, if the build number of the Level 1 (e.g., stable_engine) branch was greater than or equal to 705.60 it would mean that the branch includes the changes from the L2X branch. Therefore, a new bug report would be logged into the defect tracking database.

Turning to FIG. 9, a web-based application 1000 that can employ the object model of the subject innovation is shown. In an aspect, communications with the defect tracking database (e.g., Product Studio-brand, database 106) can be accomplished via a centralized web service component 1002. The centralized web service component 1002 can provide services including, but not limited to, bug lookup, opening new bug, attaching files and updating bugs. The web service component 1002 can be accessed from virtually any machine (e.g., 1004) and eliminates the needs for specific platform-based clients. In still other aspects, the tool 104 can be distributed on all machines 1004 to achieve maximum degree of parallel processing. In operation, the web service component 1002 can facilitate a lab machine 1004 equipped with the novel verification tool 1004 to communicate to the defect database backend 1006 thus accessing and/or transferring data with a defect data store 106. It will be appreciated that is alternative configuration can move from a simple client-server model to a more distributed and scalable multi-tier model.

In accordance with the novel functionality of this and the other described aspects, special attention has been paid to configurability of the tool 104 to enable it to be usable in a wide range of frameworks and suitable for different processes and policies. It is to be understood that components of the tool (e.g., 202, 204 of FIG. 2) and subcomponents thereof including, but not limited to, the product issue description, search algorithm and bug filing template, can be custom configured by simply changing settings in the configuration file (e.g., XML configuration file). In order to maintain some global level uniformity while allowing maximum customization, the configuration can be split into a system policy and a user policy. For example, the system policy can overrule user settings if desired. It will be appreciated that these components can make the novel tool 104 particularly versatile and extensible.

Moreover, as described earlier, the report component 304 of FIG. 3 can facilitate gathering files when recording a particular fault or bug. In aspects of the innovation, the files can be specified for which to gather. For example, multiple sets of files can be specified to attempt to tie a detected fault to a bug in the defect data store(s). As well, if necessary, this specified information can be employed upon bug filing. Additionally, information necessary to reproduce a bug can be gathered and recorded.

Figure 11:
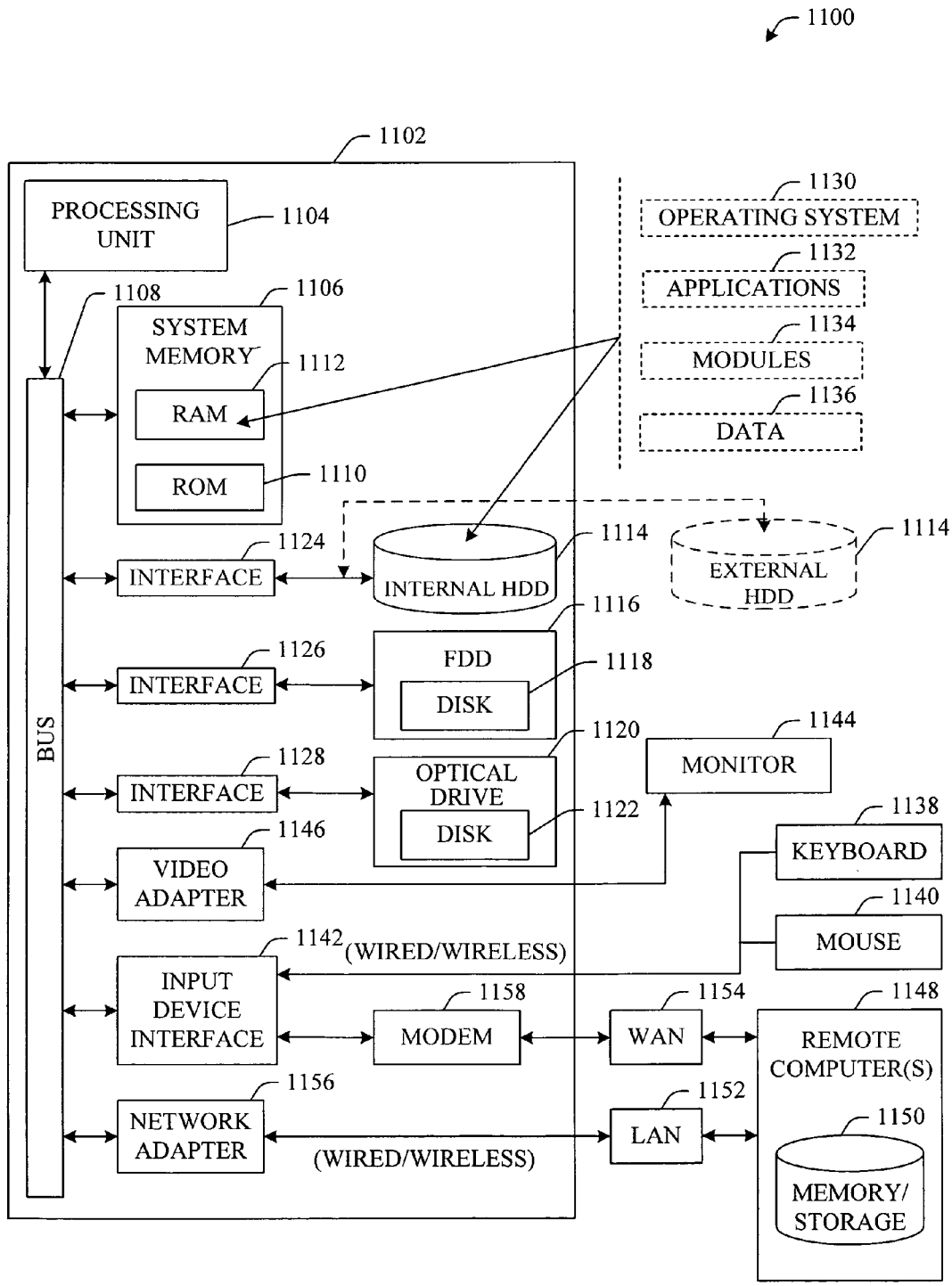
FIG. 11 illustrates a block diagram of a computer operable to execute the disclosed architecture.

Referring now to FIG. 11, there is illustrated a block diagram of a computer operable to execute the disclosed architecture of verifying and/or tracking faults. In order to provide additional context for various aspects of the subject innovation, FIG. 11 and the following discussion are intended to provide a brief, general description of a suitable computing environment 1100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
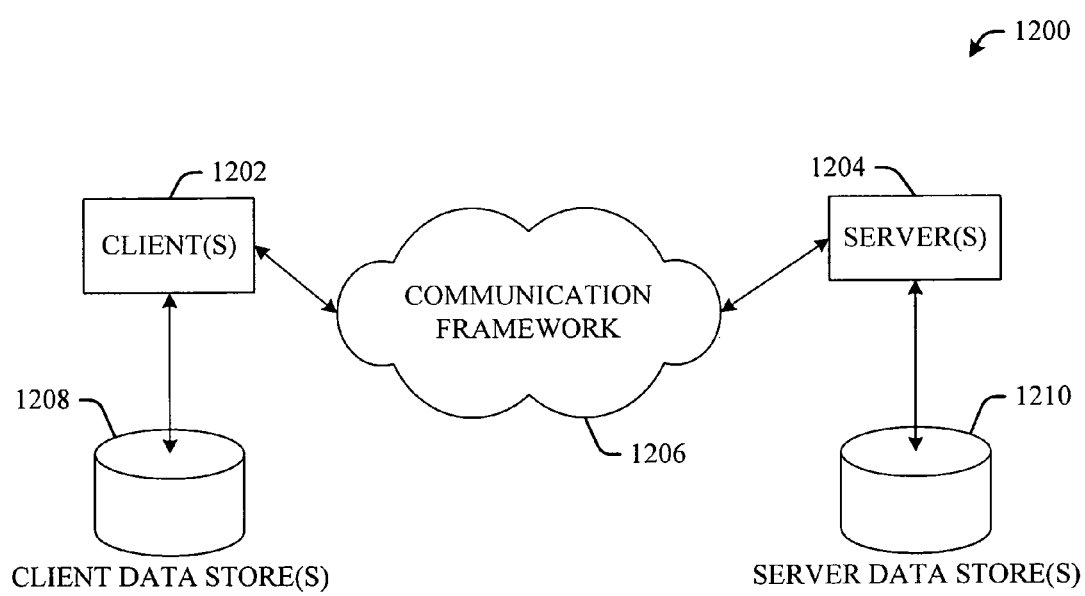
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject automated products defects analysis and reporting tool. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates automatically tracking product defects, comprising:
   a processor; and
   a memory communicatively coupled to the processor, the memory having stored therein computer-executable instructions to implement the system, including:
      a data store that stores product defect information, wherein the product defect information includes at least one or more previously reported product defects;
      a receiving component that receives an input that represents a found product defect, the found product defect is at least one of a bug or a fault, the input includes a plurality of data obtained upon detection of the found product defect;
      a search component that facilitates searching the data store for matching previously reported product defects;
      a verification tool component that automatically tracks the input in the data store, wherein the verification tool employs an artificial intelligence component on the input to identify a previously reported product defect that matches the found product defect, upon more than one previously reported product defect being identified as a possible match to the found product defect, the artificial intelligence component selects a previously reported product defect from the identified defects that is a best match to the found product defect by a classifier employing a probabilistic and statistical based analysis to infer an action that a user desires to be automatically performed via a function that maps an input attribute vector to a confidence that the input belongs to a class, wherein attributes in the input attribute vector are fault types, and the class is a category or an area of interest;
      an update component that upon the matching previously reported product defect being found, updates the matching previously reported product defect by linking the found product defect to the matching previously reported product defect; and
      a report component that upon the search component not finding a matching previously reported product defect in the data store, stores the found product defect in the data store.

2. The system of claim 1, the input is received from a crash dump.

3. The system of claim 1, further comprising an analyzer component that analyzes the input and extracts an associated function call and call stack.

4. The system of claim 3, the analyzer component employs DScript technology to facilitate extraction.

5. The system of claim 1, wherein the search component comprises a compare component that compares the input to a plurality of previously reported product defects based at least in part upon one of a function call stack, a file name, a line number, an issue description or a test name.

6. A computer-implemented method for automatically tracking product defects, comprising:

employing a processor executing computer executable instructions to perform the following acts:

storing product defect information in a database, wherein the product defect information includes at least one or more previously reported product defects;

receiving an input that represents at least one of a bug or a fault related to a found product defect, the input including a plurality of data obtained upon detection of the found product defect;

searching the database for previously reported product defects that are possible matches to the found product defect;

determining whether the found product defect matches a previously reported product defect, wherein the determination is based upon a utility analysis, the utility analysis factors a possibility of adding the found product defect to the database as a new product defect that is a duplicate to a previously reported product defect and a risk of not adding the found product defect to the database as a new product defect due to attributing the found product defect as a match to a previously reported product defect;

upon determining that the found product defect matches more than one previously reported product defects, selecting a previously reported product defect from the matched previously reported product defects that is a best match to the found product defect by employing a probabilistic and statistical based analysis to infer an action that a user desires to be automatically performed via a classification function that mars an input attribute vector to a confidence that the input belongs to a class, wherein attributes in the input attribute vector are fault types, and the class is a category or an area of interest;

upon determining that the found product defect matches a previously reported product defect, updating the matching previously reported product defect by linking the found product defect to the matching previously reported product defect; and upon determining that the found product defect does not match a previously reported product defect, storing the found product defect in the database as a new product defect.

7. The computer-implemented method of claim 6, further comprising receiving the input from a crash dump.

8. The computer-implemented method of claim 6, wherein determining whether the found product defect matches a previously reported product defect further comprises analyzing the input and extracting an associated function call and call stack.

9. The computer-implemented method of claim 8, employing one or more filters to remove irrelevant portions of the call stack.

10. The computer-implemented method of claim 8, further comprising:

employing one or more filters to remove portions that are common between the call stack of the found product defect and a call stack associated with the previously reported product defect; and comparing the remaining portions of the call stacks.

11. The computer-implemented method of claim 6, further comprising increasing a priority associated with the matching previously reported product defect.

\* \* \* \* \*

UNITED STATES PATENT AND TRADEMARK OFFICE
CERTIFICATE OF CORRECTION

| | | |
|---|---|---|
| PATENT NO. | : 7,614,043 B2 | Page 1 of 1 |
| APPLICATION NO. | : 11/283917 | |
| DATED | : November 3, 2009 | |
| INVENTOR(S) | : Alexandre Ognev et al. | |

It is certified that error appears in the above-identified patent and that said Letters Patent is hereby corrected as shown below:

In column 17, line 31, in Claim 6, delete "mars" and insert -- maps --, therefor.

Signed and Sealed this

Fifteenth Day of February, 2011

David J. Kappos
*Director of the United States Patent and Trademark Office*